United States Patent
Li et al.

(10) Patent No.: US 11,110,985 B2
(45) Date of Patent: Sep. 7, 2021

(54) MULTIMEDIA SYSTEM OF A SHARED BICYCLE

(71) Applicant: HANGZHOU QINGQI SCIENCE AND TECHNOLOGY CO., LTD., Zhejiang (CN)

(72) Inventors: Gang Li, Hangzhou (CN); Guotai He, Hangzhou (CN); Meimiao Feng, Hangzhou (CN); Zaixing Li, Hangzhou (CN); Sheng Liu, Hangzhou (CN)

(73) Assignee: HANGZHOU QINGQI SCIENCE AND TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/784,481

(22) Filed: Feb. 7, 2020

(65) Prior Publication Data
US 2020/0172189 A1    Jun. 4, 2020

Related U.S. Application Data

(63) Continuation of application No. PCT/CN2018/089635, filed on Jun. 1, 2018.

(30) Foreign Application Priority Data

Aug. 7, 2017    (CN) .......................... 201720982024.0
Feb. 6, 2018    (CN) .......................... 201820211296.5

(51) Int. Cl.
*B62J 50/22*    (2020.01)
*B62J 45/20*    (2020.01)
(Continued)

(52) U.S. Cl.
CPC .............. *B62J 50/22* (2020.02); *B62J 6/165* (2020.02); *B62J 45/10* (2020.02); *B62J 45/20* (2020.02);
(Continued)

(58) Field of Classification Search
CPC ... B62J 50/22; B62J 45/20; B62J 45/10; B62J 50/225; B62J 6/165; B62J 50/20;
(Continued)

(56) References Cited

U.S. PATENT DOCUMENTS

2016/0039496 A1    2/2016    Hancock et al.
2016/0134968 A1    5/2016    Chung

FOREIGN PATENT DOCUMENTS

CN    101989442 A    3/2011
CN    106779882 A    5/2017
(Continued)

OTHER PUBLICATIONS

International Search Report in PCT/CN2018/089635 dated Aug. 15, 2018, 6 pages.
(Continued)

*Primary Examiner* — Hai Phan
*Assistant Examiner* — Anthony D Afrifa-Kyei
(74) *Attorney, Agent, or Firm* — Metis IP LLC

(57) ABSTRACT

The present disclosure relates to a multimedia system of a shared bicycle. The multimedia system includes a lock main control unit, a cloud server, and a display unit. The display unit includes a navigation module, a multimedia module, and a mode switching module. The multimedia module includes a data switching sub-module. The mode switching module is configured to switch to a navigation mode or a multimedia mode. The data switching sub-module is configured to switch multimedia information. The display unit broadcasts the multimedia information to achieve advertising purposes. The navigation module provides navigation for a user, which is convenient for the user to travel and can avoid a dangerous behavior of the user. In addition, the data switching sub-module controls the multimedia system to broadcast different multimedia information in different time (Continued)

periods, different environments and different regions, thereby further improving the user experience.

20 Claims, 5 Drawing Sheets

(51) Int. Cl.
*B62J 45/10* (2020.01)
*B62J 50/21* (2020.01)
*B62J 6/165* (2020.01)
*G01C 21/36* (2006.01)

(52) U.S. Cl.
CPC ........ *B62J 50/225* (2020.02); *G01C 21/3629* (2013.01)

(58) Field of Classification Search
CPC ... B62J 50/21; B62J 50/25; B62J 50/28; B62J 99/00; B62J 50/00; G06F 21/604; G06F 3/041; G06F 3/04817; G06F 3/0482; G06F 3/04845; G06F 3/04847; G06F 3/0488; G06F 3/04883; G06F 3/167; G10L 15/22; G10L 15/26; G10L 2015/223; H04L 12/4625; H04L 67/125; H04L 67/025; H04L 12/2803; H04L 67/12; H04L 67/00; H04M 1/72583; H04M 2201/34; H04M 2250/74; H04M 1/7253; H04M 1/72533; G05B 2219/2642; G05B 15/02; G05B 15/00; G05B 19/042; G05B 19/418; G05B 2219/13144; G08C 2201/93; G08C 17/00; G08C 17/02; H04W 4/40; H04W 4/80; Y02D 30/70; G01C 21/3697; G01C 21/3629

See application file for complete search history.

(56) References Cited

FOREIGN PATENT DOCUMENTS

| | | | |
|---|---|---|---|
| CN | 106871910 A | 6/2017 | |
| CN | 107202590 A | 9/2017 | |
| DE | 102015201537 A1 | 8/2016 | |
| EP | 3651131 A1 | 5/2020 | |
| EP | 3651132 A1 | 5/2020 | |
| KR | 20130089082 A | 8/2013 | |
| WO | WO-2018219252 A1 * | 12/2018 | .............. B62J 50/20 |

OTHER PUBLICATIONS

Written Opinion in PCT/CN2018/089635 dated Aug. 15, 2018, 10 pages.
The Extended European Search Report in European Application No. 18845002.7 dated Nov. 24, 2020, 14 pages.

* cited by examiner

MULTIMEDIA SYSTEM OF A SHARED BICYCLE

CROSS-REFERENCE TO RELATED APPLICATIONS

This application is a Continuation of International Application No. PCT/CN2018/089635, filed on Jun. 1, 2018, which claims priority to Chinese Patent Application No. 201820211296.5 filed on Feb. 6, 2018, which claims priority to Chinese Patent Application No. 201720982024.0 filed on Aug. 7, 2017, the entire contents of each of which are hereby incorporated by reference.

TECHNICAL FIELD

The present disclosure generally relates to the field of bicycle sharing, and in particular, to a multimedia system of a shared bicycle.

BACKGROUND

Bicycle sharing refers to a provision of bicycle sharing services on campuses, subway stations, bus stations, residential areas, commercial areas, public service areas, etc., via cooperation between enterprises and the government, which is a new form of sharing economy.

When a user opens a bicycle sharing app, the user can view a distribution map of nearby bicycles that can be rented, make an appointment, etc. After a user finds a bicycle, the bicycle can be unlocked by scanning a quick response (QR) code with a mobile phone or by inputting a code. After the user finishes riding, the bicycle can be parked in an area where bicycles are allowed to be parked on both sides of a road. Then the bicycle can be locked and the use of the bicycle is finished.

However, for existing shared bicycles, there is no multimedia system on the bicycles. As an emerging platform, it cannot make good use of its inherent multimedia information transmission channels, which causes a waste of resources. In addition, the existing shared bicycles have no navigation function, accordingly, a user needs to use a mobile phone to navigate a trip while riding a bicycle, which is very dangerous and easily causes traffic accidents.

Therefore, how to reasonably control a bicycle sharing platform for multimedia information dissemination, how to reasonably control the multimedia system for route navigation, how to control the multimedia system to broadcast different multimedia information in different environments or different time periods, and further improve user experience, have been one of key research issues for those skilled in the art.

SUMMARY

Aiming at the above-mentioned disadvantages of prior arts, the technical problems to be solved in the present disclosure is to provide a multimedia system of a shared bicycle to solve the problem that existing shared bicycles lack a multimedia broadcasting device and a navigation device and the problem that the multimedia system broadcasts different multimedia information in different time periods, different environments, and different regions.

In order to solve the technical problems, the present disclosure provides a multimedia system of a shared bicycle. The multimedia system includes a lock main control unit, a cloud server, and a display unit. The lock main control unit is connected to the cloud server and the display unit, respectively. The display unit includes a navigation module, a multimedia module, and a mode switching module. The mode switching module is connected to the navigation module and the multimedia module, respectively. The multimedia module includes a data switching sub-module.

The lock main control unit controls the display unit to turn on when the lock is unlocked, and controls the display unit to turn off when the shared bicycle ends a trip.

The cloud server pushes multimedia information to the lock main control unit. The mode switching module controls the display unit to switch to a navigation mode or a multimedia mode. The lock main control unit controls the display unit to display navigation information in the navigation mode or control the display unit to display the multimedia information in the multimedia mode.

The cloud server transmits a multimedia switching signal to the lock main control unit. The lock main control unit controls the multimedia module to switch the multimedia information via the data switching sub-module and controls the display unit to display selected multimedia information in the multimedia mode.

As used herein, the preferred solution is that the cloud server transmits the multimedia switching signal to the lock main control unit according to different time periods. The lock main control unit controls the multimedia module to switch the multimedia information via the data switching sub-module and controls the display unit to display the selected multimedia information in the multimedia mode.

As used herein, the preferred solution is that the cloud server transmits the multimedia switching signal to the lock main control unit according to different environments where the shared bicycle is located. The lock main control unit controls the multimedia module to switch the multimedia information via the data switching sub-module, and controls the display unit to display the selected multimedia information in the multimedia mode.

As used herein, the preferred solution is that the cloud server transmits the multimedia switching signal to the lock main control unit according to different regions where the shared bicycle is located. The lock main control unit controls the multimedia module to switch the multimedia information via the data switching sub-module, and controls the display unit to display the selected multimedia information in the multimedia mode.

As used herein, the preferred solution is that the display unit includes a first display screen. The first display screen is set at the head of the bicycle.

As used herein, the preferred solution is that the display unit includes a second display screen. The second display screen is set above a rear tire of the bicycle.

As used herein, the preferred solution is that the first display screen is configured to display the navigation information or the multimedia information, and the second display screen is configured to display the multimedia information.

As used herein, the preferred solution is that the multimedia system further includes a voice broadcasting unit. The voice broadcasting unit includes a first speaker and a second speaker. The first speaker is connected to the navigation module and is configured to broadcast navigation voice information. The second speaker is connected to the multimedia module. The second speaker is configured to broadcast multimedia voice information.

As used herein, the preferred solution is that the voice broadcasting unit further includes a voice controller. The voice controller is connected to the first speaker and the second speaker, respectively. The voice controller is configured to control the second speaker to stop broadcasting the multimedia voice information upon detecting that the first speaker broadcasts the navigation voice information.

As used herein, the preferred solution is that the multimedia system includes a lock main control unit, a mobile terminal, and a display unit. The lock main control unit is connected to the mobile terminal and the display unit, respectively. The display unit includes a navigation module, a multimedia module, and a mode switching module. The mode switching module is connected to the navigation module and the multimedia module, respectively. The multimedia module includes a data switching sub-module.

The lock main control unit controls the display unit to turn on when the lock is unlocked, and controls the display unit to turn off when the bicycle ends a trip.

The mobile terminal pushes multimedia information to the lock main control unit. The mode switching module controls the display unit to switch to a navigation mode or a multimedia mode. The lock main control unit controls the display unit to display navigation information in the navigation mode or control the display unit to display the multimedia information in the multimedia mode.

The mobile terminal transmits a multimedia switching signal to the lock main control unit. The lock main control unit controls the multimedia module to switch the multimedia information via the data switching sub-module, and controls the display unit to display selected multimedia information in the multimedia mode.

Compared with the prior art, the beneficial effect of the present disclosure is that, an advertising purpose is achieved by designing a multimedia system for a shared bicycle. The multimedia system is provided with a display unit. The display unit broadcasts multimedia information. At the same time, the multimedia system is provided with a navigation module configured to provide navigation for a user, which is convenient for the user to travel and can avoid a dangerous behavior of holding a navigation device to view a route while riding the shared bicycle. In addition, the multimedia system is provided with a data switching sub-module configured to control the multimedia system to broadcast different multimedia information in different time periods, different environments, and different regions, thereby further improving the user experience and facilitating the user to obtain more information.

BRIEF DESCRIPTION OF THE DRAWINGS

The present disclosure is further described in terms of drawings and embodiments, and wherein.

DETAILED DESCRIPTION

Preferred embodiments of the present disclosure will be described in detail with reference to the accompanying drawings.

Figure 1:
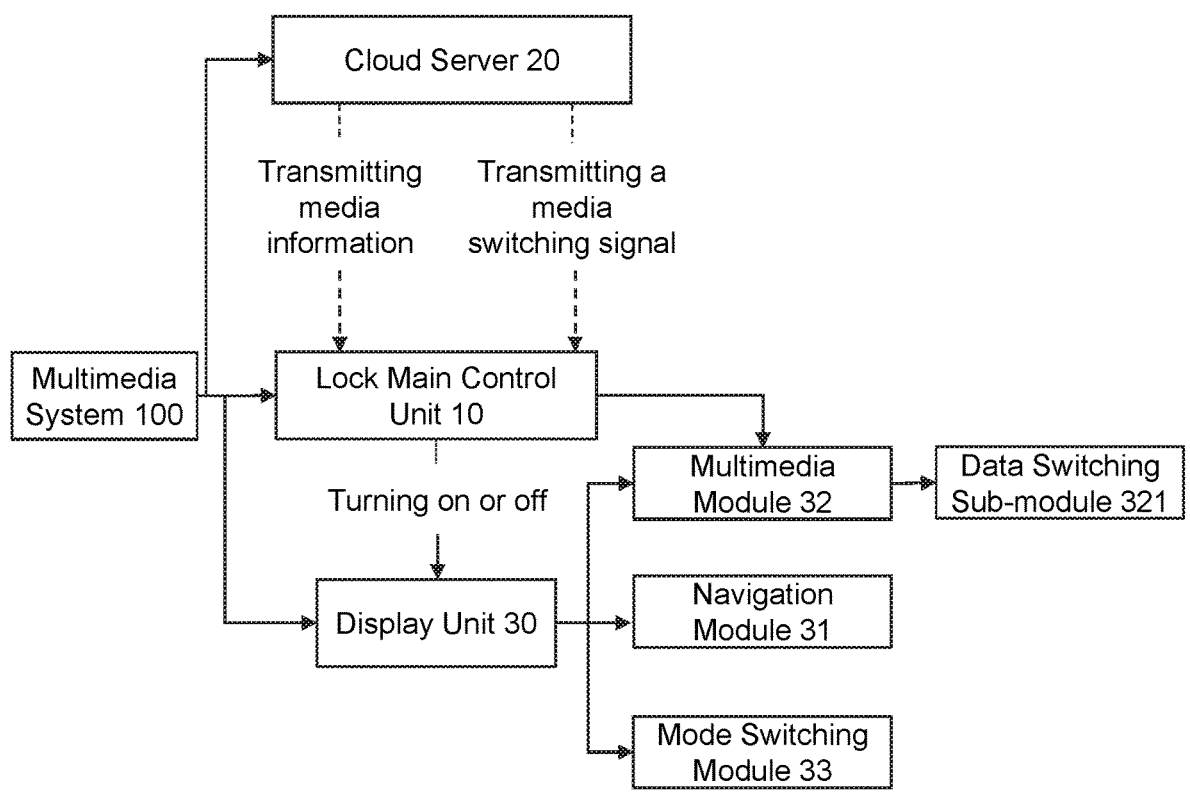
FIG. 1 is a first block diagram of a multimedia system in the present disclosure.

As shown in FIG. 1, the present disclosure provides a preferred embodiment of a multimedia system 100.

The multimedia system 100 of a shared bicycle includes a lock main control unit 10, a cloud server 20, and a display unit 30. The lock main control unit 10 is connected to the cloud server 20 and the display unit 30, respectively. The display unit 30 includes a navigation module 31, a multimedia module 32, and a mode switching module 33. The mode switching module 33 is connected to the navigation module 31 and the multimedia module 32, respectively. The multimedia module 32 includes a data switching sub-module 321.

As used herein, the lock main control unit 10 controls the display unit 30 to turn on when the lock is unlocked and control the display unit 30 to turn off when the shared bicycle ends a trip. The cloud server 20 pushes multimedia information to the lock main control unit 10. The mode switching module 33 controls the display unit 30 to switch to a navigation mode or a multimedia mode. The lock main control unit 10 controls the display unit 30 to display navigation information in the navigation mode or control the display unit 30 to display multimedia information in the multimedia mode. The cloud server 20 transmits a multimedia switching signal to the lock main control unit 10. The lock main control unit 10 controls the multimedia module 32 to switch the multimedia information via the data switching sub-module 321 and controls the display unit 30 to display the selected multimedia information in the multimedia mode.

In this embodiment, a user can select the navigation mode 31 or the multimedia mode 32 by himself or herself to obtain different information according to requirements. In addition, the multimedia mode 32 stores multiple pieces of multimedia information. The cloud server 20 transmits the multimedia switching signal to the lock main control unit 10 according to different time periods. For example, the cloud server 20 transmits a multimedia switching signal to the lock main control unit 10 at twelve o'clock at noon. The lock main control unit 10 controls the multimedia module 32 to switch to food advertisements via the data switch sub-module 321 and controls the display unit 30 to display the food advertisements. Alternatively, the cloud server 20 transmits the multimedia switching signal to the lock main control unit 10 according to the different environments where the shared bicycle is located. For example, the cloud server 20 detects that a shared bicycle in a certain area is located in a rainy area, and transmits a multimedia switching signal to the lock main control unit 10. The lock main control unit 10 controls the multimedia module 32 to switch to umbrella advertisements via the data switching sub-module 321 and controls the display unit 30 to display the umbrella advertisements. Alternatively, the cloud server 20 transmits the multimedia switching signal to the lock main control unit 10 according to different regions where the shared bicycle is located. For example, the cloud server 20 detects that the shared bicycle is in a high-tech industrial park, and transmits a multimedia switching signal to the lock main control unit 10. The lock main control unit 10 controls the multimedia module 32 to switch to digital product advertisements via the data switching sub-module 321 and controls the display unit 30 to display the digital product advertisements. It helps the user to obtain different multimedia information in different time periods, different environments, and different regions, and the user experience is further improved.

Specifically, the lock main control unit 10 is a main control circuit board built in a lock portion of the shared bicycle. The main control circuit board is provided with a display circuit for display. The display circuit is the display unit 30. Alternatively, an independent display circuit board is connected to the main control circuit board for data interaction. The navigation module 31, the multimedia module 32, and the mode switching module 33 are sub-circuits embedded in the main control circuit board. Alternatively, independent sub-circuit boards are respectively connected to the main control circuit board for data interaction. Alternatively, independent sub-circuit boards are respectively connected to the display circuit board for data interaction. The data switching sub-module 321 is a data switching circuit embedded in the main control circuit board. Alternatively, an independent data switching circuit board is connected to the main control circuit board for data interaction. Alternatively, an independent data switching circuit board is connected to a sub-circuit board of the multimedia module 32 for data interaction.

Figure 2:
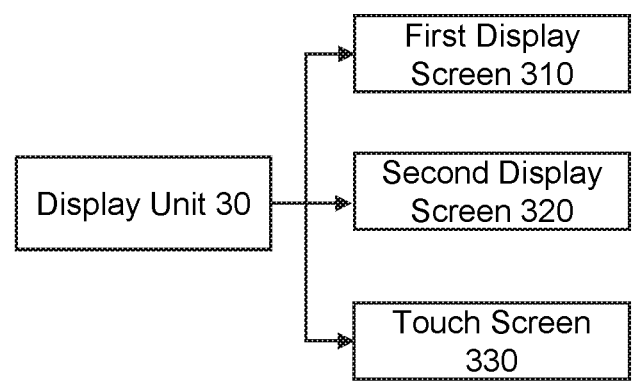
FIG. 2 is a first block diagram of a display unit in FIG. 1.

As shown in FIG. 2, the present disclosure provides a preferred embodiment of the display unit 30.

Specifically, a display screen 21 includes a first display screen 211. The first display screen 211 is set at the head of the bicycle, so that the user can observe information on the display screen 21 at first glance during riding. The display screen 21 is connected to a power source of the shared bicycle. The power source is charged by a solar charging device of the shared bicycle and is charged by a power generating hub. At the same time, the display screen 21 communicates with the lock main control unit 10 via a wired connection or a wireless connection. The wireless connection includes wireless communication connections such as Bluetooth communication, WIFI communication, radio frequency communication, mobile communication, etc. If the wired connection is used, wires are arranged inside the frame of the shared bicycle, thereby improving the overall beauty of the shared bicycle.

Preferably, the display screen 21 further includes a second display screen 212. The second display screen 212 is set above a rear tire of the bicycle, for example, a prominent position such as a seat, the frame of a wheel, etc.

As used herein, the first display screen 310 is configured to display the navigation information or the multimedia information. The second display screen 320 is configured to display the multimedia information. The first display screen 310 is provided with a switch. If the user turns on the switch upon turning on the first display screen 310, the first display screen 310 displays the navigation information. If the user does not turn on the switch upon turning on the first display screen 310, the first display screen 310 displays the multimedia information.

Further, the display unit 30 further includes a touch screen 330. The touch screen 330 is attached to a front surface of the first display screen 310. The touch screen 330 is configured to sense a user's touch position, thereby realizing the human-computer interaction function. The user selects a departure location and a destination by clicking the first display 310, and then a trip navigation is implemented. Preferably, the touch screen 330 is an infrared touch screen 330, a capacitive touch screen, a nano touch screen, or a resistive touch screen. Of course, the touch screen 330 is not limited to the ones described above, and not listed here one by one.

Figure 3:
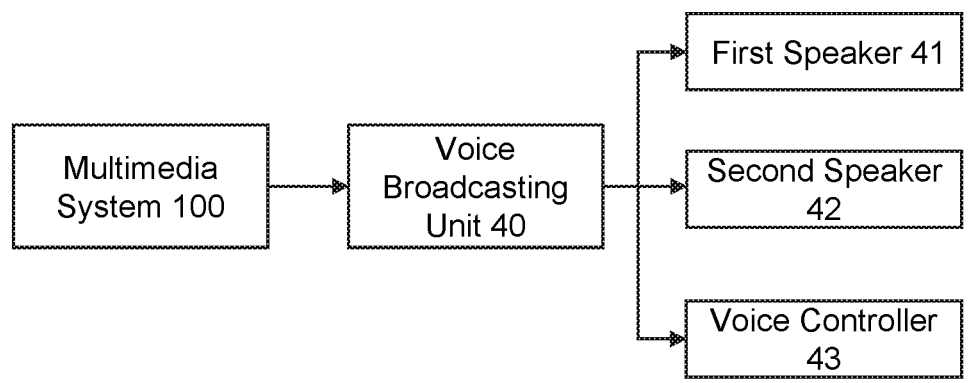
FIG. 3 is a second block diagram of a voice playing unit in FIG. 1.

As shown in FIG. 3, the present disclosure provides a preferred embodiment of a voice broadcasting unit 40.

Specifically, the multimedia system 100 further includes a voice broadcasting unit 40. The voice broadcasting unit 40 includes a first speaker 41 and a second speaker 42. The first speaker 41 is connected to the navigation module 31 and configured to broadcast navigation voice information. The second speaker 42 is connected to the multimedia module 32. The second speaker 42 is configured to broadcast multimedia voice information.

Further, the voice broadcasting unit 40 further includes a voice controller 43. The voice controller 43 is connected to the first speaker 41 and the second speaker 42, respectively. The voice controller 43 controls the second speaker 42 to stop broadcasting the multimedia voice information upon detecting that the first speaker 41 broadcasts the navigation voice information. Therefore, the second speaker 42 can be prevented from broadcasting the multimedia voice information when the first speaker 41 broadcasts the navigation voice information, which results in that the user cannot obtain the trip navigation and affects user use.

As used herein, the main control circuit board is provided with a voice broadcasting circuit for broadcasting voice. The voice broadcasting circuit is the voice broadcasting unit 40. Alternatively, an independent voice broadcasting circuit board is connected to the main control circuit board for data interaction. The voice controller 43 is a sub-circuit embedded in the main control circuit board. Alternatively, an independent control circuit board is connected to the main control circuit board for data interaction. Alternatively, an independent control circuit board is connected to the voice broadcasting circuit board for data interaction.

Figure 4:
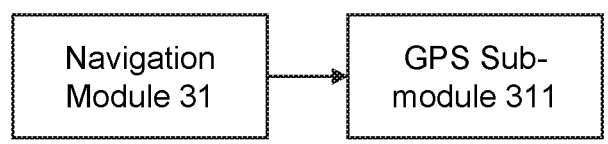
FIG. 4 is a third block diagram of a navigation module in FIG. 1.

As shown in FIG. 4, the present disclosure provides a preferred embodiment of the navigation module 31.

Specifically, the navigation module 31 includes a global positioning system (GPS) sub-module 311. The GPS sub-module 311 includes a GPS signal transmitting and receiving antenna and a GPS signal processing chip. The GPS signal processing chip obtains a GPS signal via the GPS signal transmitting and receiving antenna, implements the route navigation of the shared bicycle, and uploads location information via the GPS signal transmitting and receiving antenna, thereby achieving precise navigation.

Preferably, the multimedia information includes a page, a picture, a video, a text, and a voice. Specifically, the page covers the entire display region or a part of the display region. The picture and video are displayed in an embedding manner, such as popping-up, fading-in, etc. The picture is a picture collection. The text is related text content displayed in the display region of the display screen, or related text content is inserted when other multimedia information is broadcasted. The voice is broadcasted according to corresponding multimedia information or voice information is broadcasted independently.

Figure 5:
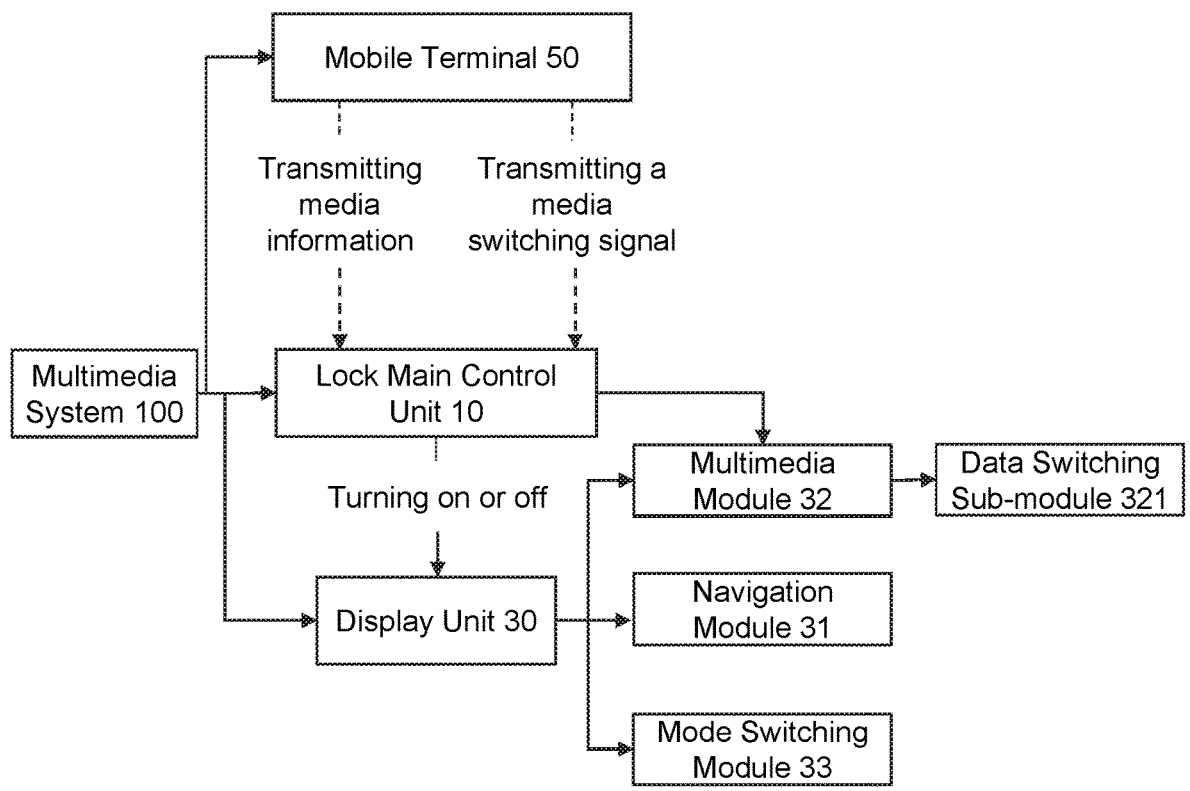
FIG. 5 is a second block diagram of a multimedia system in the present disclosure.

As shown in FIG. 5, the present disclosure provides a preferred embodiment of the multimedia system 100.

The multimedia system 100 of a shared bicycle includes a lock main control unit 10, a mobile terminal 50, and a display unit 30. The lock main control unit 10 is connected to the mobile terminal 50 and the display unit 30, respectively. The display unit 30 includes a navigation module 31, a multimedia module 32, and a mode switching module 33. The mode switching module 33 is connected to the navigation module 31 and the multimedia module 32, respectively. The multimedia module 32 includes a data switching sub-module 321.

As used herein, the lock main control unit 10 controls the display unit 30 to turn on when the lock is unlocked and control the display unit 30 to turn off when the shared bicycle ends a trip. The mobile terminal 50 pushes multimedia information to the lock main control unit 10. The mode switching module 33 controls the display unit 30 to switch to a navigation mode or a multimedia mode. The lock main control unit 10 controls the display unit 30 to display the navigation information in the navigation mode or controls the display unit 30 to display the multimedia information in the multimedia mode. The mobile terminal 50 transmits a multimedia switching signal to the lock main control unit 10. The lock main control unit 10 controls the multimedia module 32 to switch the multimedia information via the data switching sub-module 321, and controls the display unit 30 to display selected multimedia information in the multimedia mode.

In this embodiment, the user can select the navigation mode 31 or the multimedia mode 32 by himself or herself to obtain different information according to requirements. In addition, the multimedia mode 32 stores multiple pieces of multimedia information. The mobile terminal 50 transmits the multimedia switching signal to the lock main control unit 10 according to different time periods. For example, the mobile terminal 50 transmits a multimedia switching signal to the lock main control unit 10 at twelve o'clock at noon. The lock main control unit 10 controls the multimedia module 32 to switch to food advertisements via the data switch sub-module 321 and controls the display unit 30 to display the food advertisements. Alternatively, the mobile terminal 50 transmits the multimedia switching signal to the lock main control unit 10 according to the different environments of the shared bicycle. For example, the mobile terminal 50 detects that a shared bicycle in a certain area is located in a rainy area, and transmits a multimedia switching signal to the lock main control unit 10. The lock main control unit 10 controls the multimedia module 32 to switch to umbrella advertisements via the data switching sub-module 321 and controls the display unit 30 to display the umbrella advertisements. Alternatively, the mobile terminal 50 transmits the multimedia switching signal to the lock main control unit 10 according to different regions where the shared bicycle is located. For example, the mobile terminal 50 detects that the shared bicycle is in a high-tech industrial park, and transmits a multimedia switching signal to the lock main control unit 10. The lock main control unit 10 controls the multimedia module 32 to switch to digital product advertisements via the data switching sub-module 321 and controls the display unit 30 to display the digital product advertisements. It helps the user to obtain different multimedia information in different time periods, different environments and different regions, and the user experience is further improved.

Preferably, the mobile terminal 50 is a mobile phone, a tablet computer, or other electronic devices. Of course, the mobile terminal 50 is not limited to the ones described above, and not listed here one by one.

As used herein, the lock main control unit 10 is a main control circuit board built in a lock portion of the shared bicycle. The main control circuit board is provided with a display circuit for display. The display circuit is the display unit 30. Alternatively, an independent display circuit board is connected to the main control circuit board for data interaction. The navigation module 31, the multimedia module 32, and the mode switching module 33 are sub-circuits embedded in the main control circuit board. Alternatively, independent sub-circuit boards are respectively connected to the main control circuit board for data interaction. Alternatively, independent sub-circuit boards are respectively connected to the display circuit board via an independent sub-circuit board for data interaction, respectively. The data switching sub-module 321 is a data switching circuit embedded in the main control circuit board. Alternatively, an independent data switching circuit board is connected to the main control circuit board for data interaction. Alternatively, an independent data switching circuit board is connected to a sub-circuit board of the multimedia module 32 for data interaction.

In summary, the above description is only preferred embodiments of the present disclosure, and is not intended to limit the protection scope of the present disclosure. Any modification, equivalent replacement, improvement, etc. made within the spirit and principles of the present disclosure shall be included in the scope of protection of the present disclosure.

What is claimed is:

1. A multimedia system of a shared bicycle, the multimedia system comprising a lock main control unit, a cloud server, and a display unit, the lock main control unit being connected to the cloud server and the display unit, respectively; the display unit comprising a navigation module, a multimedia module, and a mode switching module, the mode switching module being connected to the navigation module and the multimedia module, respectively, and the multimedia module comprising a data switching sub-module, wherein, the lock main control unit controls the display unit to turn on when the lock is unlocked and controls the display unit to turn off when the shared bicycle ends a trip;

the cloud server pushes multimedia information to the lock main control unit, the mode switching module controls the display unit to switch to a navigation mode or a multimedia mode, the lock main control unit controls the display unit to display navigation information in the navigation mode or controls the display unit to display the multimedia information in the multimedia mode; and the cloud server transmits a multimedia switching signal to the lock main control unit, the lock main control unit controls the multimedia module to switch the multimedia information via the data switching sub-module and controls the display unit to display selected multimedia information in the multimedia mode.

2. The multimedia system of claim 1, wherein the cloud server transmits the multimedia switching signal to the lock main control unit according to different time periods, and the lock main control unit controls the multimedia module to switch the multimedia information via the data switching sub-module and controls the display unit to display the selected multimedia information in the multimedia mode.

3. The multimedia system of claim 1, wherein the cloud server transmits the multimedia switching signal to the lock main control unit according to different environments where the shared bicycle is located, and the lock main control unit controls the multimedia module to switch the multimedia information via the data switching sub-module and controls the display unit to display the selected multimedia information in the multimedia mode.

4. The multimedia system of claim 1, wherein the cloud server transmits the multimedia switching signal to the lock main control unit according to different regions where the shared bicycle is located, and the lock main control unit controls the multimedia module to switch the multimedia information via the data switching sub-module and controls the display unit to display the selected multimedia information in the multimedia mode.

5. The multimedia system of claim 1, wherein the display unit includes a first display screen, the first display screen being set at a head of the shared bicycle.

6. The multimedia system of claim 5, wherein the display unit includes a second display screen, the second display screen being set above a rear e of the shared bicycle.

7. The multimedia system of claim 6, wherein the first display screen is configured to display the navigation information and the second display screen is configured to display the multimedia information.

8. The multimedia system of claim 1, the multimedia system further comprising a voice broadcasting unit, wherein the voice broadcasting unit includes a first speaker and a second speaker.

9. The multimedia system of claim 8, the voice broadcasting unit further comprising a voice controller, wherein the voice controller is connected to the first speaker and the second speaker, respectively.

10. A multimedia system of a shared bicycle, the multimedia system comprising a lock main control unit, a mobile terminal, and a display unit, and the lock main control unit being connected to the mobile terminal and the display unit, respectively; and the display unit comprising a navigation module, a multimedia module, and a mode switching module, the mode switching module being connected to the navigation module and the multimedia module, respectively, and the multimedia module comprising a data switching sub-module, wherein, the lock main control unit controls the display unit to turn on when the lock is unlocked and controls the display unit to turn off when the bicycle ends a trip;

the mobile terminal pushes multimedia information to the lock main control unit, the mode switching module controls the display unit to switch to a navigation mode or a multimedia mode, the lock main control unit controls the display unit to display navigation information in the navigation mode, or controls the display unit to display the multimedia information in the multimedia mode; and the mobile terminal transmits a multimedia switching signal to the lock main control unit, the lock main control unit controls the multimedia module to switch the multimedia information via the data switching sub-module and controls the display unit to display selected multimedia information in the multimedia mode.

11. The multimedia system of claim 6, wherein the second display screen is configured to display the multimedia information.

12. The multimedia system of claim 8, wherein the first speaker is connected to the navigation module and configured to broadcast navigation voice information, the second speaker is connected to the multimedia module and configured to broadcast multimedia voice information.

13. The multimedia system of claim 9, wherein the voice controller is configured to control the second speaker to stop broadcasting the multimedia voice information upon detecting that the first speaker broadcasts the navigation voice information.

14. The multimedia system of claim 1, wherein the multimedia information includes a page, a picture, a video, a text, or a voice.

15. The multimedia system of claim 10, wherein the mobile terminal transmits the multimedia switching signal to the lock main control unit according to different time periods, and the lock main control unit controls the multimedia module to switch the multimedia information via the data switching sub-module and controls the display unit to display the selected multimedia information in the multimedia mode.

16. The multimedia system of claim 10, wherein the mobile terminal transmits the multimedia switching signal to the lock main control unit according to different environments where the shared bicycle is located, and the lock main control unit controls the multimedia module to switch the multimedia information via the data switching sub-module and controls the display unit to display the selected multimedia information in the multimedia mode.

17. The multimedia system of claim 10, wherein the mobile terminal transmits the multimedia switching signal to the lock main control unit according to different regions where the shared bicycle is located, and the lock main control unit controls the multimedia module to switch the multimedia information via the data switching sub-module and controls the display unit to display the selected multimedia information in the multimedia mode.

18. The multimedia system of claim 10, wherein the display unit includes a first display screen, the first display screen being set at a head of the shared bicycle.

19. The multimedia system of claim 10, wherein the display unit includes a second display screen, the second display screen being set above a rear tire of the shared bicycle.

20. The multimedia system of claim 10, the multimedia system further comprising a voice broadcasting unit, wherein the voice broadcasting unit includes a first speaker and a second speaker.

* * * * *